United States Patent [19]

Lee

[11] 4,074,829

[45] Feb. 21, 1978

[54] VENDING MACHINE HAVING EJECTOR ASSIST MEMBER

[75] Inventor: Gerry A. Lee, Des Moines, Iowa

[73] Assignee: Fawn Engineering Corporation, Des Moines, Iowa

[21] Appl. No.: 729,189

[22] Filed: Oct. 4, 1976

[51] Int. Cl.² ........................................... B65G 59/06
[52] U.S. Cl. .................................. 221/238; 221/271
[58] Field of Search ............... 221/200, 204, 125, 270, 221/124, 238, 202, 201, 257, 235, 271

[56] References Cited

U.S. PATENT DOCUMENTS 1,778,187  10/1930  Grenier ............................. 221/235

Primary Examiner—Stanley H. Tollberg
Attorney, Agent, or Firm—Henderson, Strom & Sturm

[57] ABSTRACT

A vending machine apparatus of a type which can be manually actuated once a sufficient amount of money is inserted therein to thereby dispense a selected item is provided with an ejector assist mechanism and a mechanism for preventing the item being dispensed from tipping over during the dispensing thereof for thereby assuring a positive delivery of the item and for preventing more than one item from being dispensed at one time. An item holding structure includes a pair of flanges of a particular shape for causing items being dispensed from interfering with one another during the dispensing process.

13 Claims, 11 Drawing Figures

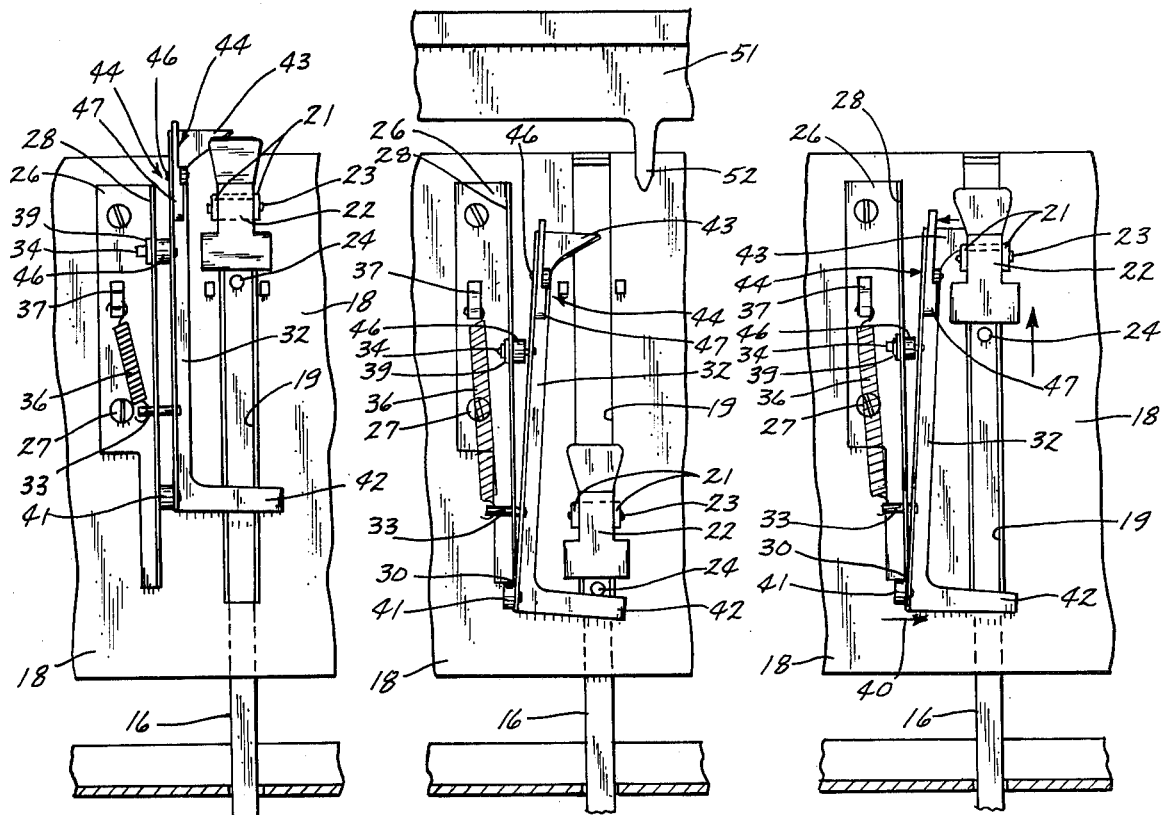
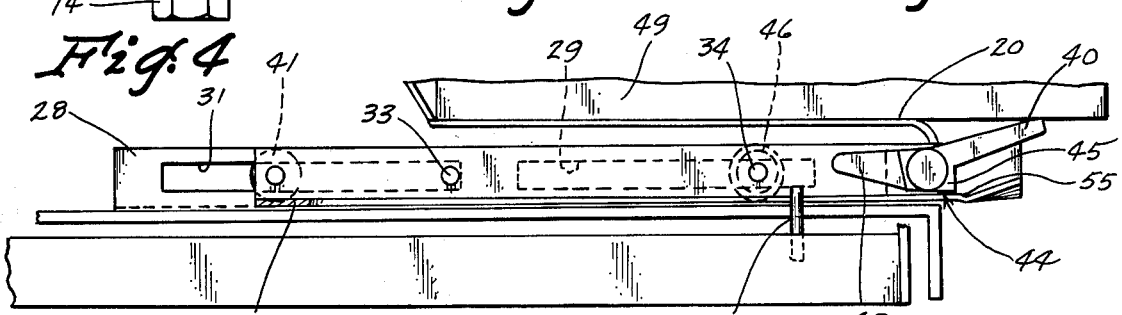
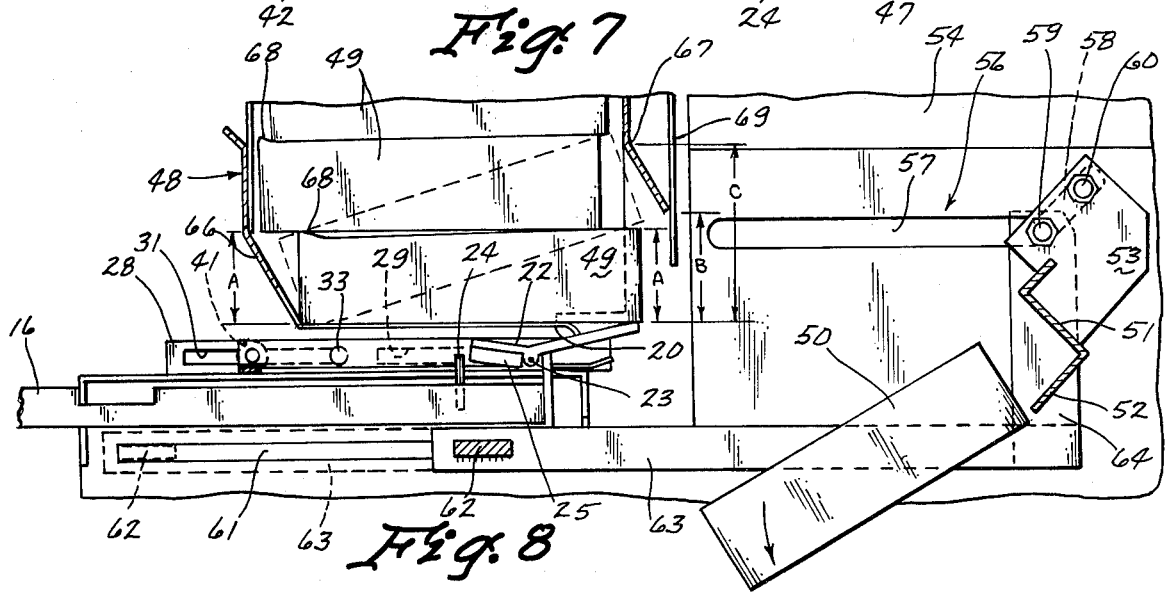

U.S. Patent  Feb. 21, 1978  Sheet 3 of 3  4,074,829
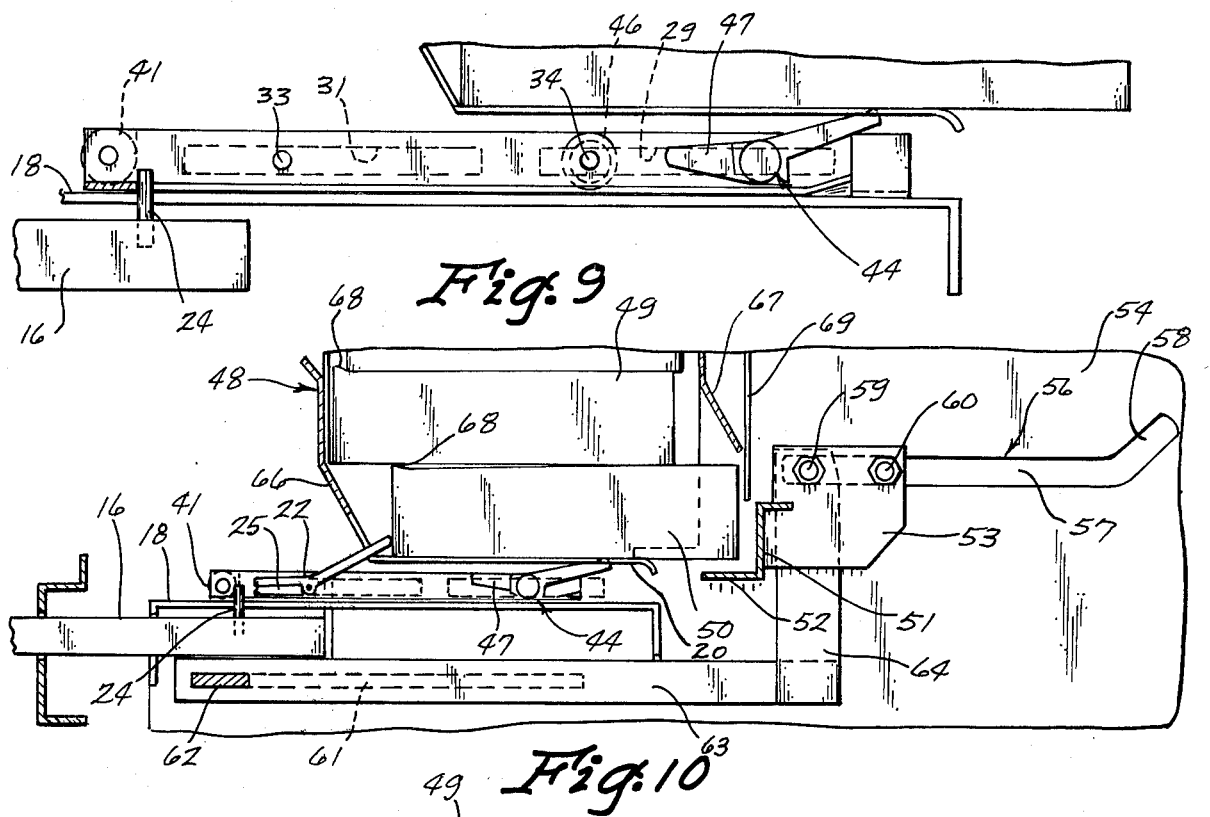
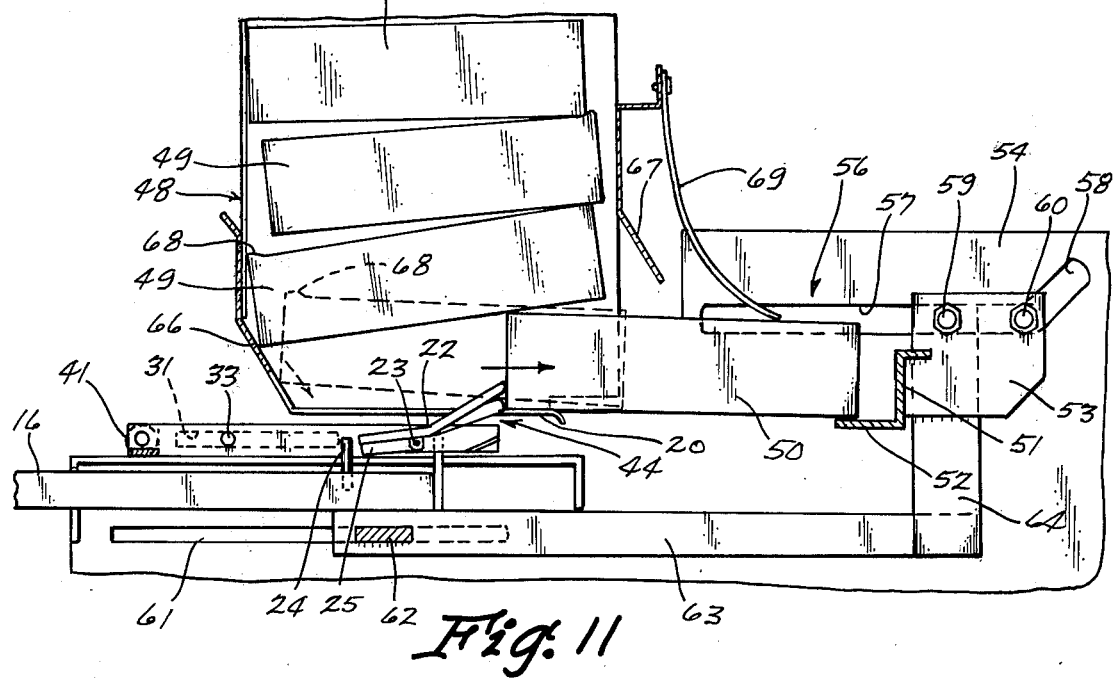

VENDING MACHINE HAVING EJECTOR ASSIST MEMBER

BACKGROUND OF THE INVENTION

The present invention relates generally to vending machines and more particularly to a manual vending machine of a type designed primarily to dispense boxed products such as laundry detergent.

One of the main problems associated with vending machines in general is the one of providing a positive ejection of the item to be dispensed when such vending machine is actuated by the proper amount of money. Another of the problems associated with vending machines in general has been that sometimes when the vending machine is actuated to release an item, a second item is released along with the first item, thereby causing the vending machine to receive less money than was due and the customer to receive more product than was deserving for the particular amount of money inserted into the machine. Furthermore, once certain shortcomings are known to customers with respect to a particular vending machine, then pilferage becomes a problem.

It has been determined that if an item being dispensed is tipped over during the process that there is more of a likelihood that a second item which has not been paid for will inadvertently be ejected into the discharge chute along with the item to be vended. Consequently, there is a need for structures which will prevent the item to be dispensed from tipping over during the dispensing thereof.

Another problem associated with boxed products such as laundry detergents is that when they are stacked one on top of another, the edges of adjacent boxes may become locked at the edges thereof. This detracts from the task of positively ejecting the one item to be dispensed and can cause the problem of either not allowing the item to be moved out of the holding chamber or it can possibly jam the mechanism consequently causing the vending machine to be inoperative until opened and manually cleared. It is furthermore well known that a vending machine which operates in a dependable fashion is likely to be the subject of less physical abuse by the customers thereof than one which has shown a tendency to be easily pilfered or which does not deliver the product which it is supposed to deliver when actuated in a proper fashion.

SUMMARY OF THE INVENTION

The present invention relates to a vending apparatus having a frame and a structure for holding a plurality of items to be dispensed therein. A platform is also connected to the frame and is disposed below the holding structure. A discharge chute is connected to one side of the holding structure and the platform for allowing the product to be delivered to customers upon proper actuation of the machine. A pull rod is slidably disposed below the platform and has a first position to which it is biased and a second position to which it can be moved. One end of the pull rod has an ejecting mechanism pivotally attached thereto for selectively engaging the lowermost of the items in the holding chute and for thereby pushing out such item into the discharge chute when the pull rod is actuated.

Additionally, a base member is attached to the platform and an ejector assist member is reciprocally attached to the base member and is movable between the first position and the second position. A spring is provided and is attached to the base member and to the ejector assist member for biasing the ejector assist member to the first position thereof. A locking mechanism is associated with the ejector assist member for selectively holding the ejector assist member in the second position thereof and further structure is provided for cooperating with the pull rod for moving the ejector assist member from the first to the second position thereof when the pull rod is moved from its first to its second position thereof. A releasing mechanism for said locking means is also provided for releasing the locking mechanism when the pull rod is moved from the second to the first position thereof, and an item engaging member is pivotally attached to one end of the ejector assist member for engaging the item to be dispensed when the locking mechanism is released and the ejector assist member is moving from the second to the first position thereof.

An object of the present invention is to provide an improved vending machine.

Another object of the invention is to provide a vending apparatus which is positive in its ejection of an item to be dispensed.

A further object of the invention is to prevent the delivery of more than one item at a time.

Still another object of the invention is to provide a vending apparatus which is dependable and troublefree in its performance.

A still further object of the invention is to provide a structure for preventing edge locking of items being dispensed.

Other objects, advantages and novel features of the present invention will become apparent from the following detailed description of the invention when considered in conjunction with the accompanying drawings.

BRIEF DESCRIPTION OF THE DRAWINGS

FIG. 4 is a top view of the ejecting mechanism of the present invention showing a pull rod in the position to which it is biased;

FIG. 5 is a view like FIG. 4 but showing the pull rod in its pulled out position;

FIG. 6 is a view like FIGS. 4 and 5 but showing the pull rod moving backwardly towards the position to which it is biased;

FIG. 7 is an enlarged view of the ejector assist structure of the present invention;

FIG. 8 is a side view taken along line 8—8 of FIG. 3;

FIG. 9 is a view like FIG. 7 but showing the pull rod in a fully pulled position and the locking means of the present invention locking the ejector assist member to its locked position;

FIG. 10 is a view like FIG. 8 but showing the pull rod in its fully pulled position; and FIG. 11 is a view like FIG. 10 but showing the pull rod being moved forwardly to release an item to be dispensed.

DESCRIPTION OF THE PREFERRED EMBODIMENT

Figure 1:
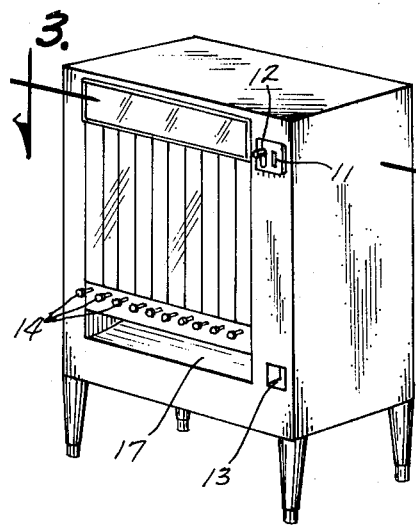
FIG. 1 is a perspective view of a vending machine constructed in accordance with the present invention.
Figure 2:
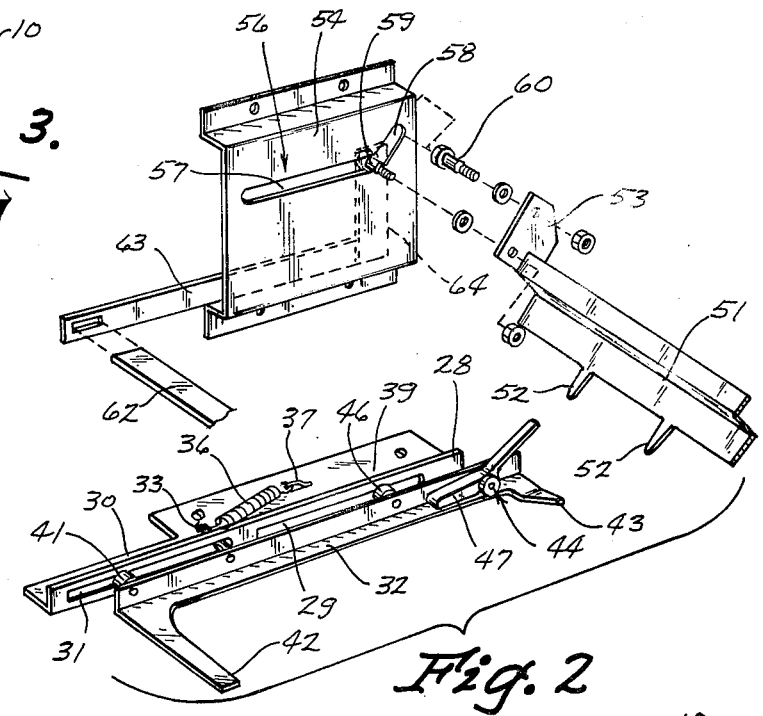
FIG. 2 is an exploded perspective view of certain aspects of the present invention.
Figure 3:
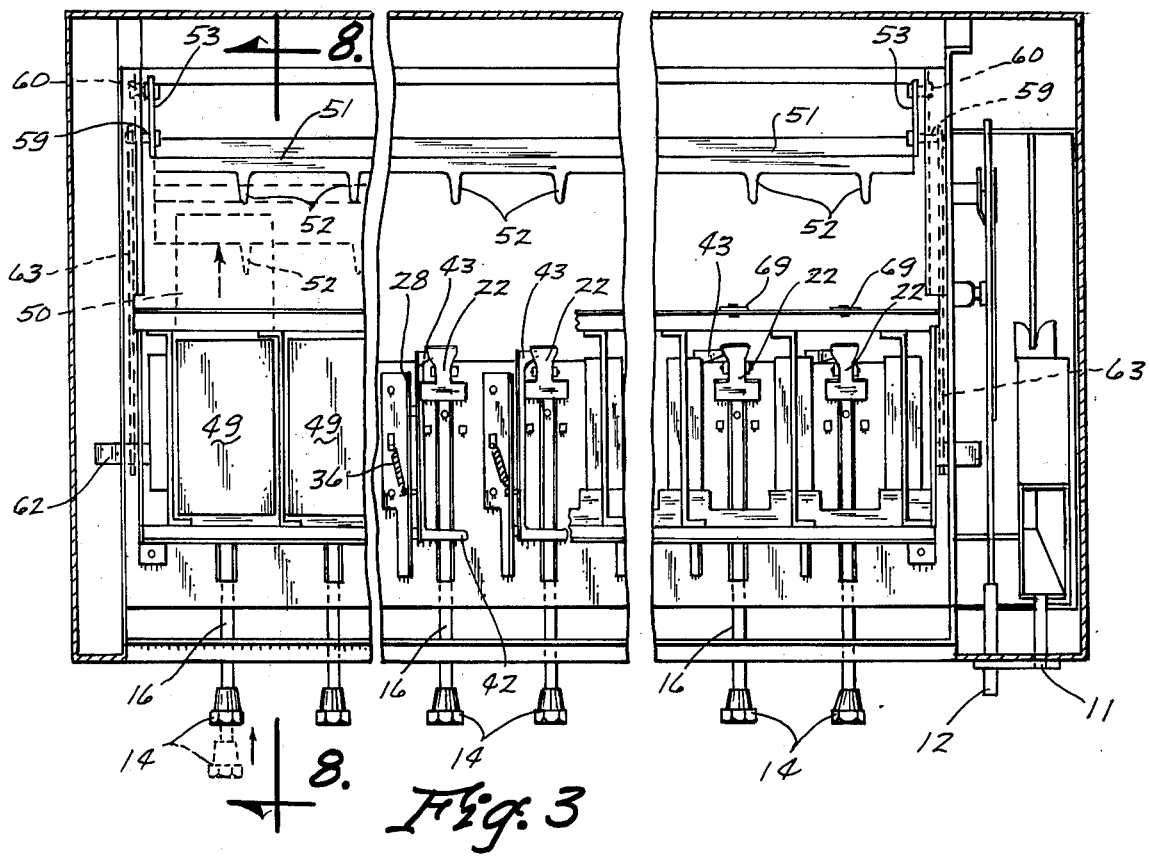
FIG. 3 is a partial cross-sectional view taken along line 3—3 of FIG. 1.

Referring now to the drawings wherein like reference numerals designate identical or corresponding parts throughout the several views, FIG. 1 shows a vending machine 10 constructed in accordance with the present invention. The particular vending machine shown has a coin slot 11 and a coin return lever 12 in the upper right front corner thereof and a coin return opening 13 in the lower right hand corner thereof. A plurality of knobs 14 are attached to pull rods 16 and such pull rods may be pulled when the proper amount of money is inserted into the coin slot 11, as is conventional and well known in this art to thereby release a product from the vending machine. Once the vending machine is actuated by pulling the pull rod 16, the product is released into the bottom of the discharge chute 17, whereby it can be removed and utilized.

Referring to FIGS. 4–8, it can be noted that a platform 18 is disposed within the vending machine 10 and is attached to a frame at the ends thereof. A slot 19 is disposed in the platform 18 and the pull rod 16 is located directly below the slot 18. A pair of flanges 21 connected to the pull rod 16 extend up through the slot 19 in the floor 18 and an ejecting member 22 is pivotally attached thereto by means of a pin 23. Also connected to the pull rod is an upstanding pin member 24. The pull rod 16 is biased to the position shown in FIG. 4 by a spring (not shown) which is, of course, conventional.

Also connected to the platform 18 is a base member 26, such as by screw members 27. The base member 26 has an upstanding flange 28 connected thereto, and this upstanding flange 28 has a pair of slots 29 and 31 formed therein.

An ejector assist member 32 is reciprocally disposed with respect to the base member 26 and the upstanding flange 28 by means of a pair of pins 33 and 34 which extend through the slots 31 and 29 respectively. A tension spring 36 is connected at one end to portion 37 of the base member 26 and at the other end to the pin 33 for thereby biasing the ejector assist member to the position shown in FIG. 4 or, alternatively, holding the ejector assist member in the locked position shown in FIG. 5.

A spacer member 38 is disposed on the pin 34 and a retainer member 39 is also attached to the pin 34 for the purpose of preventing the pin 34 from moving out of the slot 29.

The ejector assist member 32 has a projection 41 on one end thereof extending in one direction and another projection 42 on that one end but extending in an opposite direction. The other end of the ejector assist member 32 has a lock release cam projection 43 thereon, the operation of which will be explained below. Also attached to the ejector assist member 32 is an item engaging member 44 which is pivotally attached to the ejector assist member by means of a pin 46. This item engaging member 44 is weighted on the end 47 so that by gravity it will remain in the position shown in FIG. 9, but it is movable to the pivotal positions shown in FIGS. 7 and 10 when a product is resting thereon.

Disposed above each respective ejecting mechanism is an item holding structure 48 which holds a plurality of boxed products all of which will be numbered 49 except for the lowermost one which, although identical to the other items 49, will be given the numeral 50 to identify it as the particular item to be dispensed as shown in these drawings.

Also associated with the ejecting mechanism shown is a product supporting structure 51 having supporting fingers 52 thereon. This product supporting or anti-tip over feature 52 is rigidly attached to a plate 53 at each side of the vending machine. Each side of the vending machine frame 54 has a camming slot 56 formed therein and this camming slot 56 has a first straight portion 57 and a second straight portion 58 disposed at an angle with respect to the first portion 57. A pair of nut and bolt cam devices 59 and 60 are connected to each of the end plates 53 and extend through the camming slot 56 and are furthermore movable therein as will be explained below. Also disposed in the end plates 54 is a groove 61 on each side. A bar 62 extends through each of the slots 61 and thereby extends entirely across the vending machine. This bar 62 is also connected at each end to a rod member 63 which is, in turn, connected rigidly to an upstanding member 64 which is then connected to the first camming bolt member 59. This bar member 62 is then coupled to the pull member 16 such that it moves with the pull rod 16, for example as shown in FIGS. 8, 10 and 11. The bar 62 is spring biased to the position shown in FIG. 8 and is movable to the position shown in FIG. 10. There is a hook portion (not shown) on the underside of each pull rod 16 which engages the bar 62 and pulls it from the FIG. 8 to the FIG. 10 position whenever a pull rod 16 is pulled out. Of course, the pulling out of one pull rod 16 does not affect the other pull rods 16.

It is important to note that the ejector assist assembly 32 travels behind the product 50 from the FIG. 11 position until the product 50 is dropped down the chute 17. Because of the presence of the member 44 under the rear end of the next product 49 to be dispensed at the time that product 50 is released down chute 17, the rear end of lowermost product or item 49 is held up in the air with respect to the forward end of lowermost product 49, thereby preventing it from tipping out and being released down the chute 17 prematurely.

Attention is directed to stop 45 (FIg. 7) and portion 55 of member 32 which prevents member 44 from pivoting any farther in a clockwise direction as viewed in FIG. 7, thereby causing the portion 40 of member 44 to engage box 49 and hold the rear end thereof slightly upwardly and prevent the box 49 from tipping into the discharge chute 17.

It is also important to mention that the timing of the movement of supporting structure 51 is critical. That is, the fingers 52 must be under the rear of the product 50 at all times during the movement of the product 50 from the FIG. 10 position to the position of FIG. 8, and until it is released as shown in FIG. 8. Otherwise, the product 50 would just tip out in an unreliable way. This is especially true when boxed products such as laundry detergents are used, since the weight of the majority of the product is often concentrated at the rear end thereof, causing more of a tendency for the product 50 to tip over.

Referring to FIGS. 8–11, it is noted that the item holding structure 48 has a pair of flanges 66 and 67 which extend in one direction for the purpose of causing the items 49 to be moved to the right as shown in FIG. 8 as they move downwardly. The reason for this particular configuration is to prevent what is commonly referred to in the industry as "edge locking." Referring to FIG. 8, for example, it is noted that boxed products tend to have a shape such as at the point 68 on the box 49 in FIG. 8. If this particular box 49 were to be only moved straight downwardly and not be moved to the right as is caused by the flange 66, then when the ejecting means 22 is used to try to push against the box 50, it would lock against the lower lefthand corner of the box immediately above it and create a resistance to being so moved. Sometimes this resistance is great enough to prevent proper functioning of the machine; that is, it could be great enough to cause no product at all to be dispensed or, alternatively, it could possibly jam the entire machine, subsequently losing further product sales until the machine has been opened and cleared. Consequently, it can easily be appreciated that this feature also aids in preventing pilferage and adds to the dependability of the structure shown.

The flange members 66 and 67 are arranged in a specific manner which is critical for the proper operation of the aspect of this invention relating to the prevention of edge locking of products as discussed above. It is noted that the distance B (FIG. 8) from lowermost point 65 on flange member 67 is more than one thickness A (FIG. 8) of product 49 or 50 to allow the lowermost product 50 to move to the right as shown in FIGS. 10 and 11. But the distance B must also be less than twice the distance A so as to prevent more than one product or item from being pushed out of the item holding mechanism 48 during one actuation of the machine. Furthermore, the distance C must be greater than the distance B, but less than twice the distance A. It has been found that if this critical relationship is not maintained that the boxes will jam. For example, referring to the structure of U.S. Pat. No. 2,360,573, it has been determined that since the taper of flange 33a begins at or above the second box from the bottom that when the lower box is pushed out that the box immediately above it will often be forced against the flange 33a causing it to jam and sometimes even causing the end of the box opposite the flange 33a to move upwardly. Of course, this U.S. Pat. No. 2,360,576 is designed for manual removal of the boxes so the instant problem was not contemplated. This would be a problem, however, in the structure shown in French Pat. No. 1,386,781 (1964).

It is also important that the flange 66 begin its taper at a distance A from the upper surface of the item supporting member 20, that is, approximately the thickness A of the boxes to be dispensed. The reason for this is to cause the boxes 49 to tip approximately to the position shown in dashed lines in FIG. 8, and to prevent an opposing tipping action, especially preventing the front end (having portion 68 thereon) from tipping up and the other end tipping down, which would cause the machine to jam. Such an opposite tipping action is particularly a problem in the structure shown in the above referred to French Patent.

Still another feature provided for assuring that only one item is dispensed at one time is the leaf spring 69 shown in FIG. 8, 10 and 11. The description of this leaf spring 69 will be explained below.

In operation, the purchaser would place enough money in coins into the slot 11 (FIG. 1) so as to release a lock on the machine and allow one of the knobs 14 to be manually pulled, as is very well known in this art. The pull rod 16 would initially be in the position shown in FIG. 4 and this pull rod 16 would be pulled outwardly from the machine to the outwardmost extreme position as shown in FIG. 5. During this movement of the pull rod 16 from the FIG. 4 to the FIG. 5 position, the ejecting mechanism 22 is pivoted downwardly as shown in FIG. 8 so that it can pass under the lowermost of the items in the holding structure 48. As the pull rod 16 is moved from the FIG. 4 to the FIG. 5 position, the pin 24 contacts the projection 42 of the ejector assist member 32 and causes the bias of the spring 36 to be overcome such that the ejector assist member 32 is moved in the same direction as the pull rod 16 and furthermore is slightly pivoted about the axis of the pin 32 so that the projection 42 becomes locked behind the end 30 of the upstanding flange 28. The FIG. 5 position corresponds to the FIG. 10 position and it is noted that at that point the ejecting member 22 pivots to the position shown in FIG. 10 by means of a counterweight 25 attached on one end of the member 22, so that the ejecting member 22 is in a position to engage the back end of the item 50. Additionally, it is noted that because of the connection of the pull rod 16 to the bar 62 that the product supporting structure 51 is moved accordingly into a position whereby the fingers 52 are in a position to support the item 50 to prevent it from tipping, before the ejector assist member or anti-tip over member 32 leaves its normal position.

As the pull rod 16 is moved back into the machine from the position shown in FIG. 5 towards the position shown in FIG. 4, it is noted that it will first reach the position shown in FIGS. 6 and 11, which figures show identical positioning of the structure of this invention. Referring specifically to FIG. 11, it is noted that the ejecting member 22 has moved the item 50 rearwardly, overcoming the force of the leaf spring 69, but note also that the leaf spring 69 is holding the box or item 50 downwardly against the fingers 52 and against the member 20 so that no tipping of the item 50 will occur at that point in time. It is important to note also that the ejecting member 22 is in contact with the lock release cam projection 43 so that once the pull rod 16 is moved from the FIG. 6 position to the FIG. 4 position that this abutment between the ejecting member 22 and the lock release cam projections 43 will cause the ejector assist member to be pivoted about the pin 34 and thereby cause the projection 41 to be moved in the direction of the arrow 40 (FIG. 6) and thereby release the locking effect between the projection 41 and the edge 30 of the upstanding flange 28, which contact is being maintained by the tension spring 36. Once the projection 41 clears the edge 30, then the ejector assist member 32 will move quickly from the position shown in FIG. 6 to the position shown in FIG. 4 because of the force of the spring 36. However, it is noted that the item engaging member 44 is also gravity biased by a weight 47 to the position shown in FIGS. 9 and 11 so that once the box 50 passes over the item engaging member 44 (FIG. 10) to the position shown in FIG. 11, then the item engaging member 44 will be moved by gravity so that it is in a position to engage the rear end of the box 50 upon release of the locking structure including projection 41 and end 30 of upstanding flange 28. Consequently, upon the release of the ejector assist member 32 as described above, the item engaging member 44 will snap against the rear end of the item 50 thereby giving it an extra push in addition to the push of the ejecting member 22. This extra push by the item engaging member 44 occurs simultaneously with the movement of the finger members 52 from the position shown in FIG. 11 to the position shown in FIG. 8 such that the item 50 is supported to the end by the fingers 52, but when the item engaging member 44 snaps forwardly it very positively ejects the item 50 into the discharge chute 17 and past the leaf spring 69. Most importantly, with a machine manually controlled by the consumer, the ejector assist member or anti-tip over member 32 follows item 50, preventing another product or item 49 from tipping or being jiggled out behind item 50.

It is noted that once the item is ejected, which corresponds to FIGS. 4 and 8, that the leaf spring 69 quickly moves back against the flange 67 and thereby is in a position to aid the ejector assist member or anti-tip member 32 in preventing the next and then lowermost item from being pilfered from the machine. Of course the vending machine 10 is then in a position to perform another similar transaction with a customer.

Consequently, it is believed to be clear that the invention described does indeed accomplish the objects set forth above. Obviously, many modifications and variations of the present invention are possible in light of the above teachings. It is therefore to be understood that, within the scope of the appended claims, the invention may be practiced otherwise than as specifically described.

I claim:

1. A vending apparatus comprising:
   a frame; a platform connected to said frame; means for holding a plurality of items to be dispensed, said holding means being connected to said frame and disposed above said platform; a discharge opening disposed rearwardly of said platform; a pull rod slidably disposed below said platform and having a first position and a second position; means pivotally attached to said pull rod for selectively ejecting one of said items from said holding means, said ejector means having a first pivotal position for passing under said items and a second pivotal position for engaging one of said items thereby causing the said one item to be moved from the holding means; the improvement comprising:
   a base member attached to said platform;
   an ejector assist member reciprocally attached to said base member and movable between a first position and a second position;
   biasing means for biasing said ejector assist member to said first position thereof;
   locking means for selectively holding said ejector assist member in said second position thereof;
   means for moving said ejector assist member from the first to the second position thereof when said pull rod is moved from the first to the second position thereof;
   means for releasing said locking means when said pull rod is moved from the second to the first position thereof; and
   means attached to said ejector assist member for engaging and following said item being dispensed when said locking means is released and said ejector assist member is moving from the second to the first position thereof and for holding the rear end of the next item to be dispensed upwardly with respect to the front end thereof to prevent more than one item from being dispensed at one time.

2. A vending apparatus as defined in claim 1 and further comprising:
   means attached to said frame rearwardly of said platform supporting the rear of said item while the item is being ejected and released once said item is ejected.

3. A vending apparatus as defined in claim 2 wherein said supporting means is operably attached to said pull rod whereby movement of said pull rod from the second to the first position thereof causes said supporting means to move from a supporting to a released position.

4. A vending apparatus as defined in claim 3 wherein said connection between the supporting means and the pull rod includes a camming member having a camming slot therein, said camming slot having a first straight portion and a second straight portion, said second straight portion, a first and a second cam member disposed in said camming slot, a supporting finger member attached to said first and second cam members, said second cam member being disposed in said first straight portion of this camming slot in the supporting position of the supporting means and in the second portion of the camming slot in the released position of the supporting means.

5. A vending apparatus as defined in claim 1 including means for pivotally attaching the engaging means to said ejector assist member.

6. A vending apparatus as defined in claim 1 wherein said pull rod is biased to said second position.

7. A vending apparatus as defined in claim 1 wherein a leaf spring is attached to said frame and is disposed rearwardly of said platform and above said discharge opening.

8. A vending apparatus as defined in claim 1 wherein said releasing means comprises a cam projection connected to said ejector assist member for selective engagement with said ejecting means.

9. A vending apparatus as defined in claim 1 wherein said locking means comprises:
   an upstanding flange member connected to said base member, a first and a second slot disposed in said upstanding flange;
   a first and second pin member rigidly attached to said ejector assist member, said first pin member slidably disposed in said first slot and said second pin member slidably disposed in said second slot;
   a projection means disposed on one end of said ejector assist member for selectively being disposed against one end of said upstanding flange member in the second position of said ejector assist member; and whereby said biasing means holds said ejector assist member in said second position until released by said releasing means.

10. A vending apparatus as defined in claim 1 wherein said moving means comprises an upstanding pin member rigidly attached to said pull rod, a slot in said platform for allowing said upstanding pin member to reciprocate with said pull rod; a protuberance disposed on said ejector assist member for cooperation with said upstanding pin member whereby movement of said pull rod from the first to the second position causes movement of said ejector assist member from the first position to the second locked position thereof.

11. A vending apparatus as defined in claim 1 wherein said engaging means is pivotally attached to said ejector assist member, one end of said ejector member being heavier than the other end thereof whereby it is biased to a position wherein said other end extends upwardly.

12. A vending apparatus as defined in claim 11 wherein the other end of said engaging means includes stop means attached thereto for abutting a portion of the platform and thereby preventing said engaging means from pivoting beyond a certain point to thereby hold the rear end of the lowermost item in the holding means up to prevent it from tipping into the discharge chute.

13. A vending apparatus comprising:
   a frame; means attached to said frame for holding a plurality of items to be dispensed in a stacked column, said holding means having an upper and a lower end, said holding means further having two parallel sidewalls, a front end wall, a rear end wall parallel to said front end wall and a bottom supporting wall connected to the lower end of said parallel sidewalls; means for selectively ejecting the lowermost item in said holding means from said vending apparatus; the improvement comprising:

means attached to the lower end of said holding means for moving the lowermost item in said holding means out of alignment with the other items in said holding means to prevent edge locking with the item immediately above it; said moving means including:

a first flange member attached to a lower portion of said front end wall, and extending downwardly and rearwardly therefrom;

an item supporting member having an upper surface, said item supporting member being attached to a lowermost portion of said first flange member and being disposed substantially perpendicular with respect to said sidewalls and endwalls;

a second flange member attached to a lower portion of said rear end wall and extending downwardly and rearwardly therefrom;

said second flange member being disposed substantially parallel to said first flange member, the lowermost portion of said second flange member being spaced from the upper surface of said item supporting member by a distance greater than the thickness of the item to be dispensed but less than twice said thickness;

the distance between the point of attachment of said first flange member to said front wall and the upper surface of said item supporting member being the same as the thickness of the item to be dispensed; and, the distance between the point of attachment of said second flange member and the upper surface of said item supporting member being greater than the thickness of the item to be dispensed, substantially less than twice the thickness of the item to be dispensed and greater than the distance between the lowermost portion of said second flange member and the upper surface of said item supporting member.

* * * * *